United States Patent [19]

Yoshimura et al.

[11] 4,397,524

[45] Aug. 9, 1983

[54] IMAGE-TRANSMITTING BUNDLED OPTICAL FIBERS

[75] Inventors: Kozo Yoshimura; Takenobu Higashimoto; Tetsuji Ono, all of Kanagawa, Japan

[73] Assignee: Sumitomo Electric Industries, Ltd., Osaka, Japan

[21] Appl. No.: 74,698

[22] Filed: Sep. 12, 1979

[30] Foreign Application Priority Data

Sep. 15, 1978 [JP] Japan .................. 53-113992

[51] Int. Cl.³ .................................... G02B 5/17
[52] U.S. Cl. .................... 350/96.25; 350/320
[58] Field of Search .......... 350/96.24, 96.25, 96.26, 350/96.27, 96.34, 320, 96.33; 65/2, 3 R, 3 A, 3 B, 3 C, 35

[56] References Cited

U.S. PATENT DOCUMENTS

| | | | |
|---|---|---|---|
| 2,311,704 | 2/1943 | Simison | 350/96.24 X |
| 3,148,967 | 9/1964 | Hicks, Jr. | 350/96.25 X |
| 3,190,735 | 6/1965 | Kapany | 350/96.24 X |
| 3,253,896 | 5/1966 | Woodcock et al. | 350/96.24 X |
| 3,445,785 | 5/1969 | Koester et al. | 350/96.33 X |
| 3,567,549 | 3/1971 | Hoffmeister et al. | 350/96.25 X |
| 3,690,853 | 9/1972 | Law | 350/96.25 X |
| 3,713,729 | 1/1973 | Inoue et al. | 350/320 |
| 3,837,824 | 9/1974 | Siegmund | 350/96.24 X |

Primary Examiner—John D. Lee
Attorney, Agent, or Firm—Sughrue, Mion, Zinn, Macpeak & Seas

[57] ABSTRACT

Image-transmitting bundled fibers and processes for producing the same in which a bundle of elemental image fibers is assembled without randomizing so as to maintain the picture image without distortion utilizing an inventive assembly technique. The assembled fibers are covered with cladding layer then surrounded by a light-absorbing layer of a disclosed preferred group of materials. Fiber bundles of the invention can have a length of several tens of kilometers while the bundles have a good flexibility and a sufficiently high number of elemental image fibers to convey a clear and satisfactory image.

15 Claims, 18 Drawing Figures

IMAGE-TRANSMITTING BUNDLED OPTICAL FIBERS

BACKGROUND OF THE INVENTION

The present invention relates to a method for producing a bundled fiber.

Bundled fibers are classified into those functioning as image guides for transmitting images and those functioning as light guides simply for transmitting optical energy. In an image guide for image transmission, the positions of elemental image fibers as picture elements at the incoming and outgoing ends should exactly correspond to each other in order to minimize distortion of the transmitted image. On the other hand, a light guide does not always require such an arrangement because it is only intended for transmission of light energy.

The present invention pertains to a method for producing an image guide for transmitting an image. Production methods for bundled fibers used as image guides appear to be classified into a winding method, a foil stacking method, multifiber formation, and fiber plate formation as described, for example, in the *Journal of the Society of Electric and Electronics Engineering*, Japan, Vol. 97, No. 11, November 1977. In prior methods suggested for producing image guides, although they individually have both advantages and disadvantages, none simultaneously meets all of the requirements upon the number of picture elements, the producible length, and the flexibility of fibers.

It is thus an object of the invention to provide fiber bundles for an image guide having a length of from several kilometers to several tens of kilometers with the resulting fiber bundle having a good flexibility and a sufficient number of elemented image fibers or picture elements.

Furthermore, it is an object of this invention to provide image fibers in which the transmission loss of an elemental image fiber for each picture element can be reduced to 10 dB/km or below by selection of an appropriate matrix for the picture elements. When compared with conventional fiber bundles, a markedly improved transmission distance for an image of a predetermined brightness is desired. Moreover, in view of the characteristics of the fibers used as a picture element, images from the ultraviolet to the infrared regions should be capable of being transmitted, and, as a result, the range of application for such fiber bundles is to be broadened.

SUMMARY OF THE INVENTION

These as well as other objects of the invention are met by a method for producing an image guide having multiple fibers including the steps of inserting elemental image fibers into a pipe made of quartz or multi-component glass with one end of the pipe sealed, spinning the resulting assembly at an elevated temperature while reducing the pressure at the open end of the pipe, coating a layer of a metal having a lower melting point than the material constituting the image fibers onto the spun assembly before the assembly contacts a solid surface so as to provide a protective resin coating, and cooling the spun and coated assembly. The elemental image fibers are made of either quartz or a material comprising primarily quartz, or of a multi-component glass. Instead of a metal coating, a layer of resin material such as a layer of thermosetting or ultraviolet-curable resin may be employed.

Still further, the invention encompasses a process for producing an image guide having multiple fibers in which the elemental image fibers are properly aligned without randomization by positioning the fibers inside a tube constructed of quartz or multifiber glass then introducing water into the pipe while rotating the pipe and vibrating it ultrasonically. The steps of rotation and ultrasonic vibration may be carried out simultaneously or sequentially as preferred.

Yet further, the invention relates to a process for producing an image guide by a multifiber method in which a light-absorbing layer is provided around a bundle of elemental image fibers which form picture image elements, the light-absorbing layer being a quartz pipe constructed of a rock crystal or coats doped with at least one metal selected from the group consisting of Ti, V, Cr, Mn, Fe, Co, Ni, Cu, Mo, Rh, La, Ce, Nd and W for increasing the coefficient of light-absorption of the light-absorbing layer. The invention includes also an image guide produced by this method.

Further, the invention includes a process for producing an image guide having a light-absorbing layer around elemental image fibers which form the individual picture elements including a film of quartz on the outer surface of a cladding layer surrounding a core including a matrix of the elemental image fibers with the light-absorbing layer including a material selected from the group consisting of at least one halide of a metal selected from the group consisting of Ti, V, Cr, Mn, Fe, Co, Ni, Cu, Mo, Rh, La, Ce, Nd and W and a halide of Si doped with one of these metals. An image guide produced by this process is within the invention as well. The image fibers may be constructed of a quartz glass for which the cladding layer is preferably B-doped quartz. Also, the image fibers may be constructed of quartz doped with at least one element selected from the group consisting of Ge, P, Al, Ti and Ga. In this case, the cladding layer may be either quartz glass or B-doped quartz.

DESCRIPTION OF THE PREFERRED EMBODIMENTS

Figure 1:
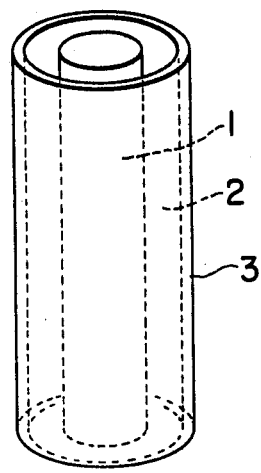
FIG. 1 is an elementary schematic view showing the structure of an elemental image fiber which forms a picture element in a fiber bundle in accordance with the invention.

FIG. 1 shows the structure of an elemental image fiber which is to become a picture element in a fiber bundle in accordance with the invention. In FIG. 1, reference numeral 1 represents a core, 2 a clad layer, and 3 a light-absorbing rod which may instead be separately introduced at the time of aligning the individual elemental image fibers.

Figure 2A:
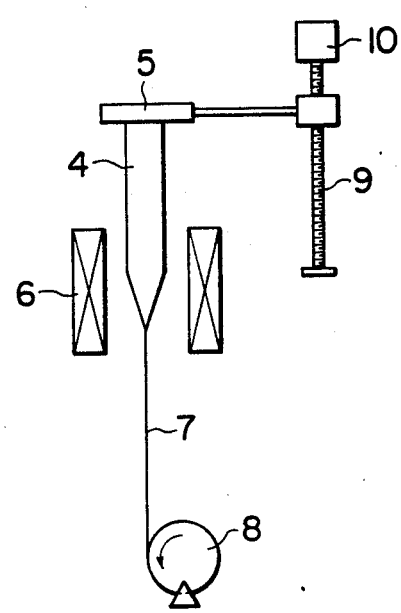
FIGS. 2A and 2B show apparatus for producing elemental image fibers in accordance with the invention.
Figure 2B:
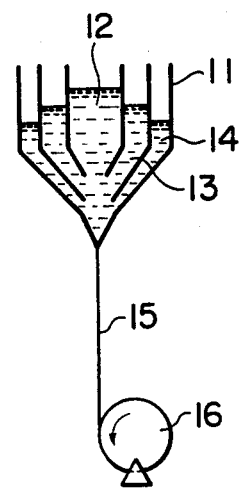

FIGS. 2A and 2B show schematically apparatus for performing a process for producing an elemental image fiber of a fiber bundle. Specifically, FIG. 2A shows schematically apparatus for performing a method for heat-softening a preform which is to become an elemental image fiber and for drawing out a fiber. FIG. 2B schematically shows a method for drawing an elemental image fiber by a double or triple crucible method.

In FIG. 2A, reference numeral 4 represents a preform, 5 a chuck portion, 6 a spinning furnace, 7 a fiber, 8 a wind-up reel, 9 a feed screw, and 10 a motor. In FIG. 2B, the reference numeral 11 represents a crucible made of, for example, platinum or quartz glass, 12 a core glass, 13 a cladding glass, 14 a light-absorbing glass, 15 a fiber, and 16 a wind-up reel.

Figure 3:
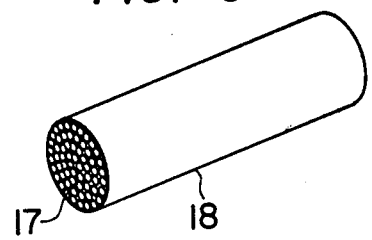
FIG. 3 shows a bundle of elemental image fibers produced by the apparatus of FIGS. 2A and 2B cut to length and inserted into a quartz or a glass pipe.

FIG. 3 shows a bundle of elemental image fibers 17 produced by the apparatus illustrated in FIGS. 2A and 2B cut to a suitable length and inserted into a quartz or glass pipe 18. In the state shown in FIG. 3, the alignment of image fibers is substantially random and, therefore, the arrangement of the elemental image fibers must be put in proper order for the bundle to be suitable for image transmission.

Figure 4:
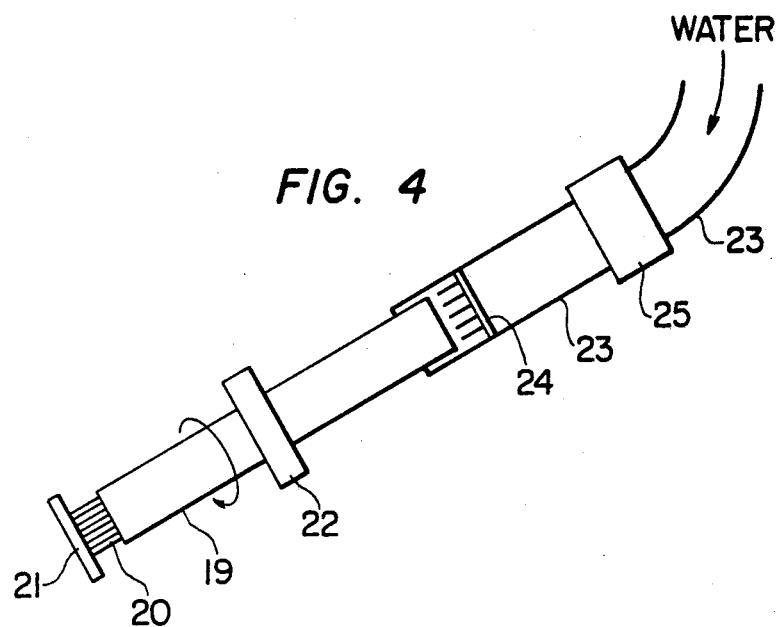
FIG. 4 shows a device for properly arranging the fibers inserted into the quartz or glass pipe of FIG. 3.

FIG. 4 shows a device for properly arranging image fibers inserted in a quartz pipe or glass pipe. In FIG. 4, the reference numeral 19 represents the quartz or glass pipe, 20 an elemental image fiber, 21 a stopper, 22 a rotary chuck portion, 23 a hose, 24 a buffer plate, and 25 a rotary joint. The image fibers are aligned by a steady flow of water passing through the rotary joint 25 and the buffer plate 24. It is important at this time to rotate the quartz or glass tube and the buffer plate in an integral manner. This operation readily results in alignment of the free fibers inserted in the pipe. The rotational direction of the quartz or glass tube may be constant. However, alignment of the elemental image fibers becomes easier by repeatedly reversing the rotating direction of the tube. The stopper 21 serves to prevent dropping of the image fibers. The coefficient of friction between it and the image fibers should be low so as to make the image fibers easy to move. It is preferably made of such a material as Teflon TM (polytetrafluoroethylene) or metal.

Figure 5:
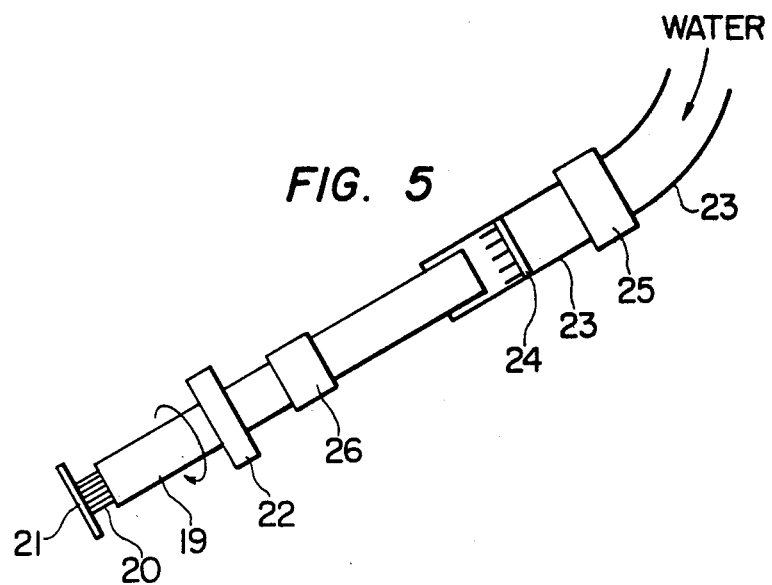
FIG. 5 shows an alternate form of such a device.

FIG. 5 shows a second device for aligning elemental image fibers which provides for a shortening of the time required for alignment by attaching an ultrasonic vibrator element 26 to the device shown in FIG. 4. In this aligning method using the ultrasonic vibrator element 26, one end of the quartz or glass pipe 19 is sealed and water is poured into it. However, without using flowing water, sufficient alignment can nonetheless be achieved by this method. The quartz or glass pipe may be rotated, but over long periods of time, sufficient alignment can be achieved even when the pipe is stationary. The equipment will be of course simplified if alignment is achieved by only pouring water without rotating the quartz or glass pipe.

Figure 6:
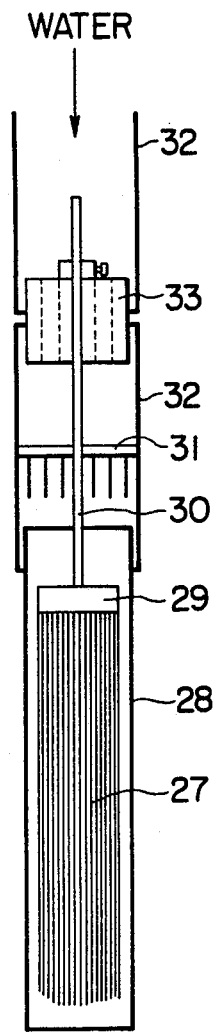
FIG. 6 shows a third embodiment of such a device.

A third device for fiber alignment is shown in FIG. 6. Reference numeral 27 represents elemental image fibers which are bonded or welded into a unitary structure at a position 29 and inserted in a glass pipe 28. The integral structure of image fibers is connected to a support member 33 via a guide rod 30. Reference numeral 31 represents a buffer plate and 32 a hose. In the device shown in FIG. 6, water flows from above and the fibers are aligned solely by the force of water flow.

The image fibers aligned in the quartz or glass pipe by any one of the methods shown in FIGS. 4, 5 and 6 are subjected to a means for fixing the relative positions of the aligned image fibers and the quartz or glass pipe to prevent disarrangement of the fibers.

Figure 7:
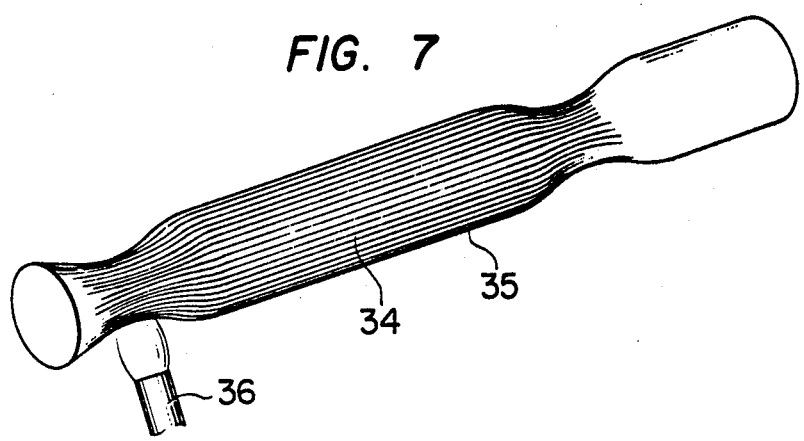
FIG. 7 is a sketch illustrating one method for fixing the elemental image fibers within the quartz or glass pipe in a fixed relative position.

FIG. 7 shows are example of a method for fixing elemental image fibers 34 with a quartz or glass pipe 35. The quartz or glass pipe is heat-softened by a burner 36. By the surface tension consequently generated, the diameter of the quartz or glass pipe is reduced in at least one position to permanently fix the arrangement of the image fibers.

By use of one of the operations described in FIGS. 1 to 7, a fiber bundle matrix for an image guide may be obtained. By spinning the matrix and reducing its diameter, a fiber bundle of a desired diameter can be produced.

Figure 8:
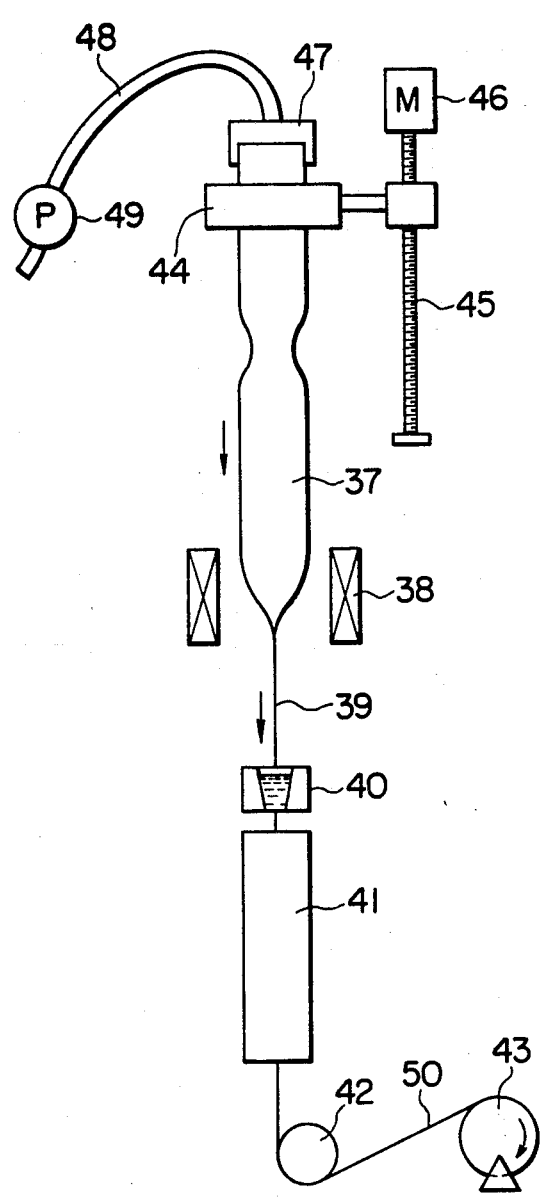
FIG. 8 shows an apparatus for spinning the bundle of fibers produced by the apparatus shown in FIG. 7.

FIG. 8 shows an apparatus for spinning the bundle fiber matrix produced by the method of FIG. 7. In FIG. 8, the reference numeral 37 represents the fiber bundle matrix, 38 a spinning furnace, 39 a spun fiber bundle, 40 a die for coating a plastic material, 41 a baking oven, 42 a guide roller, 43 a wind-up reel, 44 a chuck, 45 a feed screw, 46 a motor, 47 a suction device, 48 a hose, 49 a vacuum pump, and 50 a plastic-reinforced bundle fiber.

The matrix 37 produced by the method illustrated in conjunction with FIG. 7 is spun and reduced in diameter to become the fiber 39. Then, before it contacts a solid surface, it is coated with a thermosetting or ultraviolet-curable resin by the coating die 40. The coating is baked and cured by the baking oven 41 (or by an ultraviolet-curing oven) to obtain a plastic-reinforced fiber bundle. This technique produces a fiber bundle which is protected from air, moisture and other objects, and has sufficient strength to withstand normal use besides having a good flexibility. At this time, the pressure on the inside of the quartz or glass pipe can be reduced by sucking air from above the fiber bundle matrix. As a result, the space between the image fibers is reduced, and the density of the picture element fibers can be increased. Because in the pressure-reduced state, the outside diameter of the spun bundle fiber may be of oval shape, the chuck 44 may be a rotary chuck.

In FIG. 8, the fibers immediately after spinning may be coated with a resin followed by curing, as stated above. In an alternative embodiment, a molten metal is put into the coating die and the fibers coated with the metal.

According to the method of fixing the fiber alignment illustrated in FIG. 7, only the diameter of the quartz or glass pipe is reduced by the burner. Thus, pressure reduction from above the matrix as described with reference to FIG. 8 can be performed without difficulty. When the fiber bundle matrix is spun immediately after fiber alignment, fixing of the fiber alignment as shown in FIG. 7 is not essential.

The advantages attained with the present invention are as follows:

(1) Fiber bundles having a length of several kilometers to several tens of kilometers can be obtained since elemental image fibers obtained by spinning and diameter reduction are inserted into a quartz or glass pipe and aligned therein and are further spun and reduced in diameter. By cutting the bundle fiber, fibers of any desired length for use in an image guide can be obtained.

(2) Since aligned elemental image fibers are sealed in a quartz or glass pipe, the image fibers are protected and prevented from breaking.

(3) Aligned elemental image fibers are covered with a jacket of a quartz or glass pipe and a plastic or metal reinforcing layer is further provided thereon. Hence, a bundle fiber having adequate strength for normal use can be produced.

(4) The outside diameter of the resulting fiber bundle and the diameter of each image fiber can be freely chosen from producible ranges because an image fiber matrix is first spun and reduced in diameter, inserted into a quartz or glass pipe and then further spun and reduced in diameter.

(5) Since the elemental image fibers are spun and reduced in diameter twice, the diameter of each image fiber which is to become a picture element can be sufficiently decreased that an image of good quality can be obtained.

(6) By using quartz or quartz-type glass as the material for the elemental image fibers and jacket, the transmission loss of the image fibers can be reduced to about 10 dB/km or less. Thus, as compared with conventional bundle fibers, the transmissible distance of the bundle fiber in accordance with the invention increases strikingly for an image of a given brightness.

(7) In the described process of spinning and diameter-reduction of a fiber bundle matrix, a fiber bundle is formed while reducing the pressure on the inside of the quartz or glass tube. Accordingly, the spaces between the image fibers as picture elements can be reduced, and the density of image fibers or picture elements can be increased.

(8) Since image fibers spun and reduced in diameter are inserted in a quartz or glass pipe, the number of picture elements is theoretically unlimited. Hence, images of very high resolution can be obtained.

The image fibers used in this invention will now be described in detail. There are generally three types of optical fibers for transmitting a light power or a light signal. A first type is a fiber composed of quartz or glass composed mainly of quartz. A second type is a fiber of a multi-component glass. A third type is a fiber of plastics. In particular, the first and second fibers composed of quartz or glass composed mainly of quartz and of a multicomponent glass, respectively, are applicable to the present invention.

In a fiber made from quartz or glass composed mainly of quartz, quartz glass may be used as the core 1 in FIG. 1 with B-doped quartz glass used as the cladding layer 2. When quartz doped with at least one element such as Ge, P, Al, Ti or Ga is used as the core, quartz glass or B-doped quartz glass is used as the cladding layer.

Methods of producing a matrix for image fibers composed mainly of quartz or quartz glass include, for example, a CVD method (chemical vapor deposition method), a VAD method (vapor phase axial deposition method), and an external deposition method.

Figure 9A:
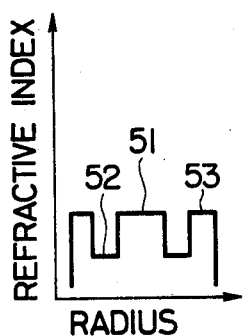
FIGS. 9A–9C and 10A–10C show examples of distributions of refractive indices of image fibers produced by various methods of the invention.
Figure 9B:
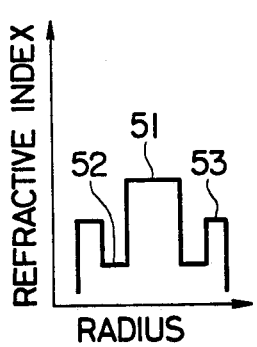
Figure 9C:
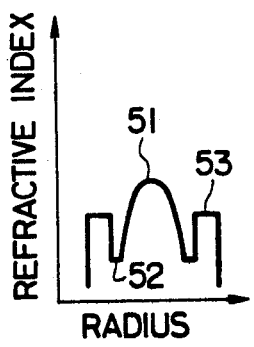

FIGS. 9A–9C and 10A–10C show examples of distributions of the refractive indices of image fibers produced by these methods. FIGS. 9A–9C relate to the case of a quartz jacket 53 using a quartz pipe as a starting material, with the reference numerals 51 and 52 representing a core and a cladding layer, respectively. FIGS. 9A–9C show examples of the distributions of refractive indices. FIG. 9A relates to the case of using B-doped quartz as the cladding layer 52 and quartz as the core 51 and the jacket 53 while FIGS. 9B and 9C relate to the case of using B-doped quartz as the cladding layer 52 and quartz doped with one or more of Ge, P, Al, Ti, Ga or the like as the core 51. Of course, quartz glass (having the same refractive index as the quartz jacket 53) may be used as the cladding layer 52. The refractive index distribution of the core may be of the stepped type as shown in FIGS. 9A and 9B or it may be of a curved type as shown in FIG. 9C. In any case, whatever the type of the refractive index distribution, if the core portion has a higher refractive index than the surrounding part, the fiber is sufficient for transmission of light.

Figure 10A:
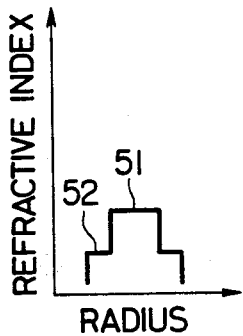
Figure 10B:
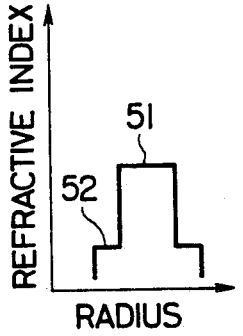
Figure 10C:
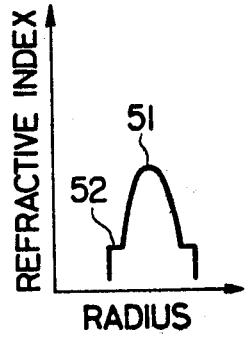

FIGS. 10A–10C show distributions of the refractive indices of image fibers which do not have a quartz jacket as described with reference to FIG. 9. In this case, too, it is sufficient that the core 51 have a higher refractive index than the cladding layer 52 (quartz glass or B-doped quartz glass) and that the refractive index distribution profile of the core be a stepped or curved type or a type containing a curve as in FIGS. 9A–9C.

A method for providing a light-absorbing layer in the image fibers having the refractive index distributions shown in FIGS. 9 and 10 or a matrix will be next described. The described light-absorbing layer serves to prevent blurring of an image which is caused by leakage of unwanted light to adjacent fibers when adjacent image fibers (picture elements) are in contact with each other. When the difference in the refractive index between the core and the cladding layer is large and the core diameter is relatively large, leakage of light to the adjacent fibers is almost negligible. Hence, in such a case, a light-absorbing layer is not essential.

When the light-absorbing layer is essential, its thickness should be kept as small as possible. This is necessary in order to secure the largest possible area for the core.

There are three methods enumerated below for providing a light-absorbing layer on elemental image fibers composed mainly of quartz or quartz-type glass or a matrix therefor.

(1) In the case of an elemental image fiber having a quartz jacket 53 as shown in FIGS. 9A–9B, the quartz jacket portion is utilized as a light-absorbing layer. For this purpose, a quartz pipe corresponding to the quartz jacket portion may be made of a material having as high as possible a transmission loss. Generally, since a quartz pipe made of naturally occurring quartz is made of rock crystal, it is high in impurities, and fortunately, thus has a very high loss. Hence a natural quartz pipe can be directly used as a light-absorbing layer. When the image transmission distance is short, this quartz pipe in the untreated state has a small effect on light absorption. In such a case, the light absorption of the quartz pipe may be increased by any of the following methods:

(i) A layer $Al_2O_3$ or the like is coated onto the outside surface of transparent quartz such as Heralux-ST (a product of Shinetsu Quartz Co., Ltd.) and subjected to a heat hysteresis at high temperatures above 1200° C. to thereby generate a devitrified layer and to increase its light absorption loss.

(ii) A quartz pipe is made by using colored rock crystal such as "violet rock crystal" as a raw material for the quartz.

(iii) Ultraviolet light, X-rays, gamma-rays, etc. are radiated onto a quartz pipe having impurities as in (i) and (ii) above or an ordinary quartz pipe causing it to discolor.

(iv) A quartz tube doped with Ti or another transition metal (such as an ozone-free quartz pipe made by Toshiba Ceramics Co., Ltd.) is used directly or it is irradiated with ultraviolet light, X-rays, gamma-rays, etc.

By employing any of the methods (i) to (iv), the light absorption loss of the quartz pipe itself is increased for its use as a light-absorbing layer.

(2) A metal coating is formed on the quartz portion of the matrix for image fibers having a refractive index as shown in FIGS. 9A–9C which corresponds to the quartz jacket portion as a light-absorbing layer. Since quartz or quartz-type glass differs markedly at high temperatures during manufacturing or processing from the metal, the thickness of the metal coating should preferably be made as thin as possible by producing the coating through vacuum deposition or the like.

(3) A layer having a large light absorption is provided simultaneously with, or separately from, the step of producing matrixes for strand fibers having a refractive index as shown in FIGS. 10A–10C. A suitable method for this is to color quartz glass with a colored ion. That is, a colored quartz glass can be obtained by doping quartz glass primarily with a transition metal such as Ti, V, Cr, Mn, Fe, Co, Ni, Cu, No, Rh, La, Ce, Nd, or W.

Figure 11:
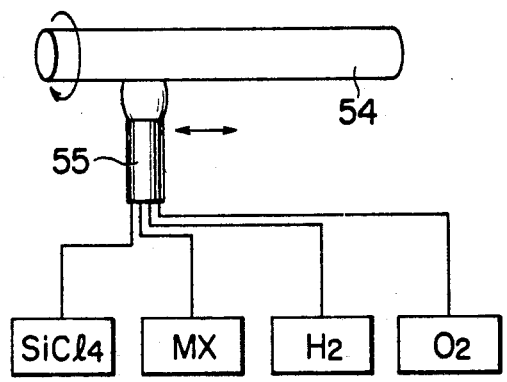
FIG. 11 schematically shows apparatus for performing a process for providing a light-absorbing layer in a separate step on the surface of an image fiber matrix.

FIG. 11 illustrates a process for providing a light-absorbing layer in a separate step on the surface of an image fiber matrix 54 having a refractive index distribution as shown in FIGS. 10A–10C. $SiCl_4$, a halide of the aforesaid transition metal (MX), $H_2$ and $O_2$ are reacted by using a burner 55, to produce for example, by flame hydrolysis, a quartz light-absorbing layer doped with the transition metal. In this case too, irradiation or ultraviolet light, X-rays, gamma-rays, etc. can be used to increase the light absorbing effect of the quartz layer the same as in the case of quartz pipes.

When a light-absorbing layer is to be provided using a multicomponent glass, the light absorption can be increased by suitably adjusting the composition of the multicomponent glass. Furthermore, by the method illustrated in FIG. 2B, a light-absorbing layer can be provided relatively easily.

Figure 12:
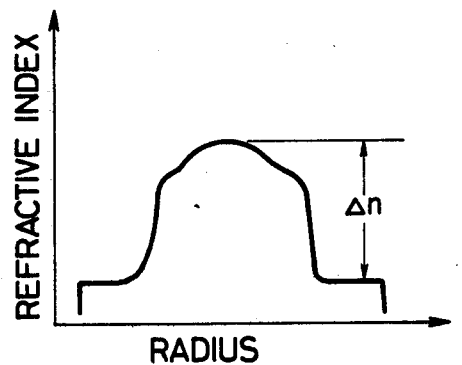
FIG. 12 shows the distribution of the refractive index of an actual matrix produced in accordance with the teachings of the present invention.

An actual example of the present invention will now be described. The elemental image fiber used was a matrix produced by the VAD method described above which consisted of a core of quartz doped with G and P and a cladding layer of B-doped quartz. The distribution of the refractive index of the matrix is shown in FIG. 12. The difference ($\Delta n$) of refractive index was about 1.2%. The refractive index distribution need not always be of the complete step type or graded type as described above as it is sufficient, if as shown in FIG. 12, a maximum occurs in the refractive index.

A matrix having a diameter of about 20 mm and the refractive index distribution shown in FIG. 12 was inserted in an ozone-free quartz pipe made by Toshiba Ceramics Co., Ltd. and spun into a fiber having an outside diameter of about 100 μm by the method illustrated in FIG. 2A and by a rod-in-tube method involving applying reduced pressure to the upper portion of the quartz pipe. The ozone-free quartz pipe used was doped with about 100 to 150 ppm of Ti and, by thermal hysteresis in the spinning process, $Ti^{4+}$ was changed to $Ti^{3+}$. As a result, the transmission loss became several hundred to several tens of thousand dB/km.

The resulting image fiber having a light-absorbing layer was cut to a length of about 30 cm and about 4000 cut fibers were inserted in a quartz pipe having an inside diameter of about 20 mm. The resultant assembly was subjected to the aligning method shown in FIG. 6 and to the fixing method shown in FIG. 7. The assembly was spun by the method shown in FIG. 8 to form a plastic-reinforced fiber.

Figure 13:
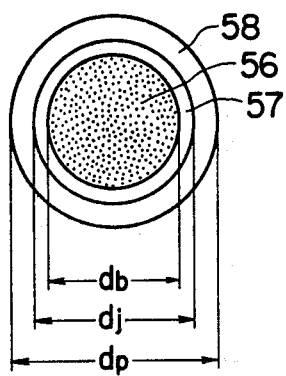
FIG. 13 shows a cross sectional view of an assembled fiber bundle of the invention.

The resulting fiber had a structure as shown in FIG. 13 in which a quartz jacket 57 encloses laterally a fiber bundle 56 of closely aligned constituent fibers with the surface of the quartz jacket coated with a plastic layer 58. The dimensions, the number of picture elements, and other characteristics of the bundle fiber produced were as follows:

Elemental fibers (diameter): about 5 μm
Number of elemental fibers as picture elements: about 4000
Diameter of the bundle fiber: db=about 0.9 mm
Diameter of the quartz jacket: dj=about 1.0 mm
Diameter of the reinforcing plastics: dp=about 1.2 mm
Length of the fiber: about 90 m A very thick fiber having an outside diameter of 1 mm was easily broken at a flexural radius of 150 mm in the absence of a plastic reinforcing agent but, by providing a plastic reinforcing layer, it was not broken at a flexural radius as low as 30 mm thereby showing its extremely high strength.

In the bundle fiber of the example, the diameter of the quartz jacket was adjusted to about 1 mm. Needless to say, by properly designing a lens system adapted to be fitted to both ends of the fiber bundle, the quartz jacket may have a smaller diameter. Of course, spinning and diameter-reduction to a diameter finer than the outside diameter of the fiber bundle obtained from a fiber bundle matrix having the same elemental fibers and the number of elemental fibers can be performed. Fiber bundles having a finer diameter have higher flexibility while the length of the fiber bundle obtained from the same matrix increases strikingly. For example, when a matrix (having a length of 30 cm) composed of about 4000 elemental fibers having an outside diameter of 100 μm inserted in a quartz pipe having an inside diameter of 20 mm as described in the example above is spun to a quartz jacket diameter (dj) of about 150 μm, the length of the resulting bundle fiber may be as large as 5400 m.

What is claimed is:

1. A process for producing an image guide of multiple fibers comprising the steps of inserting a group of elemental image fibers into a pipe made of a material selected from the group consisting of quartz and a multicomponent glass having one end sealed, spinning the resulting assembly at an elevated temperature while reducing the pressure at the open end of the pipe, coating a layer of a metal having a lower melting point than the material constituting the image fibers onto the spun assembly before said assembly contacts a solid surface to provide a protective metal coating and cooling the spun and coated assembly.

2. A process for producing an image guide of multiple fibers comprising the steps of inserting a group of elemental image fibers into a pipe made of a material selected from the group consisting of quartz and a multicomponent glass having one end sealed, spinning the resulting assembly at an elevated temperature while reducing the pressure at the open end of the pipe, coating a layer of a resin material selected from the group consisting of thermosetting and ultraviolet-curable resin materials onto the spun assembly before said assembly contacts a solid surface to provide a protective resin coating and cooling the spun and coated assembly.

3. A process according to claim 1 or 2, wherein said group of elemental image fibers comprise a material selected from the group consisting of quartz and a material comprising primarily quartz.

4. A process according to claims 1 or 2, wherein said group of elemental image fibers are multicomponent glass.

5. A process for producing an image guide of multiple fibers, by aligning elemental image fibers comprising mainly quartz or a multicomponent glass positioned in a quartz or glass pipe, said process comprising the steps of pouring water into said pipe and rotating said pipe while simultaneously vibrating said pipe by means of an ultrasonic vibrating element.

6. A process for producing an image guide of multiple fibers by aligning elemental image fibers, comprising mainly quartz or a multicomponent glass positioned in a quartz or glass pipe, said process comprising the steps of pouring water into said pipe, rotating said pipe, and vibrating said pipe by means of an ultrasonic vibrating element.

7. A process for producing a multifiber image guide by providing a light-absorbing layer around each of a plurality of elemental image fibers which form picture image elements, comprising providing a quartz pipe surrounding said elements comprising a material selected from the group consisting of colored rock crystal quartz doped with at least one metal selected from the group consisting of Ti, V, Cr, Mn, Fe, Co, Mo, Rh, La, Ce, Nd and W for increasing the coefficient of light absorption of the light-absorbing layer.

8. An image guide comprising a plurality of elemental image fibers assembled without randomization to form picture image elements of said image guide and a light-absorbing layer provided around each of said image fibers, said light-absorbing layer comprising material selected from the group consisting of colored rock salt and quartz doped with at least one metal selected from the group consisting of Ti, V, Cr, Mn, Fe, Co, Ni, Cu, Mo, Rh, La, Ce, Nd and W for increasing the coefficient of light absorption of the light-absorbing layer.

9. A process for producing a multifiber image guide by providing a light-absorbing layer around elemental image fibers which form picture image elements, each of said picture image elements comprising a core and a cladding layer formed primarily of quartz, comprising:
   forming a film of doped quartz on the outer surface of said cladding layer surrounding said core, said doped quartz light-absorbing layer being doped with a material selected from the group consisting of Ti, V, Cr, Mn, Fe, Co, Ni, Cu, Mo, Rh, La, Ce, Nd and W.

10. A process according to claim 9, wherein said doped quartz light-absorbing layer is formed by reacting $SiCl_4$, $H_2$ and $O_2$ with a halide of one of said group of materials.

11. An image guide comprising a plurality of elemental image fibers assembled without randomization to form picture image elements of said image guide, a cladding layer surrounding said image fibers, and a layer of light-absorbing material surrounding said cladding layers and comprising a metal selected from the group consisting of Ti, V, Cr, Mn, Fe, Co, Ni, Cu, Mo, Rh, La, Ce, Nd and W and a halide of Si doped with one of said metals for increasing the coefficient of light absorption of the light-absorbing layer.

12. The image guide of claim 11 wherein said image fibers comprise quartz.

13. The image guide of claim 12 wherein said cladding layer comprises B-doped quartz.

14. The image guide of claim 11 wherein said image fibers comprise quartz doped with at least one element selected from the group consisting of Ge, P, Al, Ti and Ga.

15. The image guide of claim 14 wherein said cladding layer comprises a material selected from the group consisting of glass and B-doped quartz.

* * * * *